May 24, 1927.

D. CHANDLER

RADIANT GAS LOG

Filed Oct. 11, 1926

1,630,109

INVENTOR
DEAN CHANDLER,
By his Attorneys,

Patented May 24, 1927.

1,630,109

UNITED STATES PATENT OFFICE.

DEAN CHANDLER, OF LONDON, ENGLAND, ASSIGNOR TO SOUTH METROPOLITAN GAS COMPANY, OF LONDON, ENGLAND.

RADIANT GAS LOG.

Application filed October 11, 1926, Serial No. 140,955, and in Great Britain March 19, 1926.

This invention relates to radiant gas logs.

The main object of the present invention is to provide a radiant gas log which when in use resembles a log fire.

In carrying out the invention, a radiant gas log is provided with radiants which are of fireproof material, shaped and preferably also coloured to resemble logs, and in order to obtain luminous flames resembling those which obtain in a log fire I introduce pure gas (that is, gas unadmixed with air) through pipes or passages which are preferably concealed as may be effected, for example, by arranging the said pipes or passages through the logs, the gas supply therefor being arranged at the back of the logs.

One or more Bunsen burners are also provided at or near the bottom of the logs, such as are commonly in use in gas fires. The Bunsen burners may form part of one of the logs, or I may employ a separate Bunsen burner or burners, in which latter case the burner or burners is or are preferably arranged under the logs or otherwise concealed from view.

Figure 1:
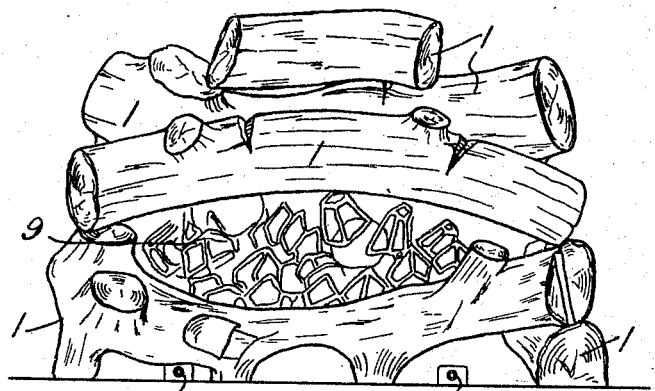
Figure 2:
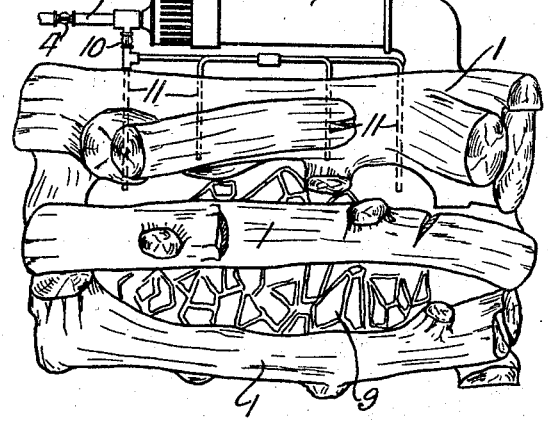
Figure 3:
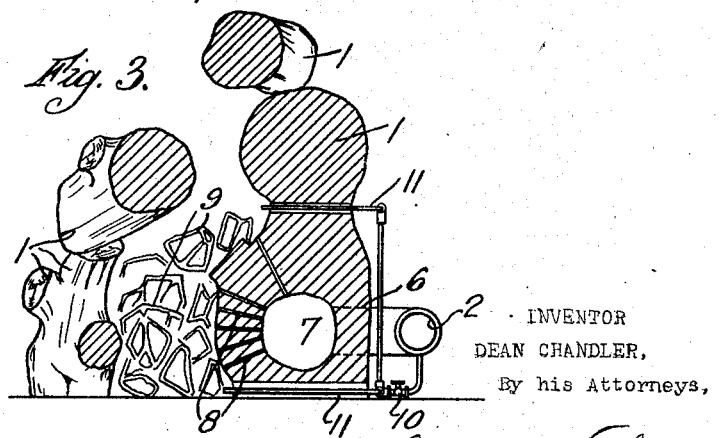

The invention is illustrated in the accompanying drawings, in which Figure 1 is a front elevation, Figure 2 is a plan, and Figure 3 is a cross section.

1 are radiants of fireproof material shaped and coloured to resemble wood logs. 2 is a Bunsen burner which is arranged at the rear of the radiants 1. The Bunsen burner 2 is supplied with gas by a pipe 3, the amount being controlled by a tap 4. Air is admitted to the burner 2 through ports 5. The mixture from the burner is led through a passage 6 to a cavity 7 formed in the centre of one of the radiants 1 (see Figure 3). 8 are passages leading from the cavity 7 to the front of the radiant 1. 9 are small radiants, such as are commonly employed in radiant gas logs. 10 is a tap through which gas unmixed with air is admitted to pipes 11 which pass through a radiant (see Figure 3). When in use, the flames coming from the gas issuing from the pipes 11 are luminous so that the radiants which resemble logs appear to be burning.

What I claim is:—

1. In a radiant gas log device, means for introducing through said log a mixture of gas and air to produce non-luminous flames and means for introducing through said log gas unmixed with air which is burned at points adjacent the non-luminous flames to produce luminous flames.

2. In a radiant gas log device, a gas log provided with a number of passages therethrough, means for supplying certain of said passages with a mixture of gas and air which burns at the outlets of said passages to produce non-luminous flames, and means for supplying other of said passages with gas unmixed with air which burns at the outlets of said passages to produce luminous flames.

In testimony that I claim the foregoing as my invention, I have signed my name this 27 day of September 1926.

DEAN CHANDLER.